(12) United States Patent
Katsura et al.

(10) Patent No.: US 11,173,911 B2
(45) Date of Patent: Nov. 16, 2021

(54) VEHICLE CONTROL DEVICE

(71) Applicants: TOYOTA JIDOSHA KABUSHIKI KAISHA, Toyota (JP); DENSO CORPORATION, Kariya (JP)

(72) Inventors: Yoichiro Katsura, Susono (JP); Yoshinori Watanabe, Isehara (JP); Takaaki Tanaka, Susono (JP); Tadashi Omachi, Kariya (JP)

(73) Assignees: TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 308 days.

(21) Appl. No.: 16/284,420

(22) Filed: Feb. 25, 2019

(65) Prior Publication Data
US 2019/0270452 A1 Sep. 5, 2019

(30) Foreign Application Priority Data

Mar. 2, 2018 (JP) ............................. JP2018-037298

(51) Int. Cl.
*B60W 30/18* (2012.01)
*G05D 1/02* (2020.01)

(52) U.S. Cl.
CPC ............... *B60W 30/18163* (2013.01); *B60W 2554/4041* (2020.02); *B60W 2554/801* (2020.02); *B60W 2710/20* (2013.01); *B60W 2720/106* (2013.01); *G05D 1/0214* (2013.01); *G05D 2201/0213* (2013.01)

(58) Field of Classification Search
CPC ..... B60W 30/18163; B60W 2554/801; B60W 2554/4041; B60W 2720/106; B60W 2710/20; B60W 60/00272; B60W 60/0015; B60W 30/16; B60W 2754/30; B60W 30/10; B60W 30/0956; B60W 30/09; G05D 2201/0213; G05D 1/0214; G08G 1/166
See application file for complete search history.

(56) References Cited

U.S. PATENT DOCUMENTS

2017/0349172 A1* 12/2017 Kubota ........... B60W 30/18163
2018/0148051 A1*  5/2018 Lujan ................... G05D 1/0214

FOREIGN PATENT DOCUMENTS

| JP | 2002-307972 A | 10/2002 |
| JP | 2016-147556 A | 8/2016 |
| JP | 2017-132408 A | 8/2017 |
| JP | 2017-185862 A | 10/2017 |

* cited by examiner

*Primary Examiner* — Alan D Hutchinson
(74) *Attorney, Agent, or Firm* — Sughrue Mion, PLLC

(57) ABSTRACT

A vehicle control device according to an example in the present disclosure detects a monitoring target vehicle that may potentially cut into an own-lane from an adjacent lane. Further, the vehicle control device first executes an evasive preparation when sensing a predetermined relative motion of the monitoring target vehicle relative to the flow of the adjacent lane. The vehicle control device executes an evasive action to avoid interference between the monitoring target vehicle and the own-vehicle.

15 Claims, 15 Drawing Sheets

VEHICLE CONTROL DEVICE

CROSS-REFERENCE TO RELATED APPLICATION

The present application claims priority under 35 U.S.C. § 119 to Japanese Patent Application No. 2018-037298, filed Mar. 2, 2018. The contents of this application are incorporated herein by reference in their entirety.

BACKGROUND

Field

The present invention relates to a vehicle control device, and particularly relates to a vehicle control device preferably used for a vehicle capable of autonomously traveling on a road that allows lane change.

Description of Related Art

JP 2017-132408 A discloses a technology related to vehicle control when there is a merging vehicle cutting into a driving lane from a merging lane at a merging place where the merging lane merges with the driving lane on which an own-vehicle is traveling.

According to the conventional technology disclosed in JP 2017-132408 A, the degree of deceleration of the own-vehicle necessary for smooth merging when it is assumed that the merging vehicle is traveling at a constant speed is compared with the degree of deceleration of the merging vehicle necessary for smooth merging when it is assumed that the own-vehicle is traveling at a constant vehicle speed. Then, action determination of whether the own-vehicle should travel ahead of the merging vehicle is performed based on a result of the comparison.

SUMMARY

In various scenes, another vehicle cuts into the own-lane. For example, in a typical cut-in scene, another vehicle traveling on an adjacent lane among two parallel lanes cuts into the own-lane. However, in the conventional technology disclosed in JP 2017-132408 A, the only cut-in scene is at a merging place between a driving lane and a merging lane. JP 2017-132408 A does not disclose action determination corresponding to a cut-in scene in which another vehicle cuts into from an adjacent lane to the own-lane.

In one method of action determination, for example, an evasive action such as deceleration control is started based on change of the lateral position of another vehicle traveling on an adjacent lane. However, the detection accuracy of change of the lateral position is low, and thus, when the method of this example is applied, the evasive action is potentially delayed, which may result in an insufficient margin between the other vehicle cutting in and the own-vehicle.

Example in the present application is intended to provide a vehicle control device capable of avoiding interference with another vehicle cutting into an own-lane from an adjacent lane.

When another vehicle traveling on an adjacent lane cuts into an own-lane, the other vehicle preforms a characteristic motion before starting lateral movement to the own-lane. Therefore, a vehicle control device according to an example in the present application, when sensing the characteristic motion, first executes an evasive preparation. And, the vehicle control device, when sensing that the other vehicle has moved into a cut-in posture after execution of the evasive preparation, executes an evasive action. Thereby, it is possible to avoid interference between the other vehicle cutting into the own-lane from the adjacent lane and an own-vehicle without providing discomfort to a passenger due to an early evasive action or an abrupt evasive action.

A vehicle control device according to an example in the present disclosure includes an object recognition unit configured to recognize an object around an own-vehicle, a monitoring target vehicle detection unit, an evasive preparation execution unit, and an evasive action execution unit. The monitoring target vehicle detection unit configured to detect a monitoring target vehicle that may potentially cut into an own-lane from an adjacent lane among objects recognized by the object recognition unit. The evasive preparation execution unit configured to execute an evasive preparation for cut-in of the monitoring target vehicle when a predetermined relative motion of the monitoring target vehicle relative to flow of the adjacent lane is sensed. The evasive action execution unit configured to execute an evasive action to avoid interference between the monitoring target vehicle and the own-vehicle when a predetermined relative motion of the monitoring target vehicle relative to the own-vehicle is sensed after the evasive preparation is executed.

The vehicle control device configured above determines an action to avoid interference based on the relative motion of the monitoring target vehicle relative to the flow of the adjacent lane and the relative motion of the monitoring target vehicle relative to the own-vehicle. Therefore, the delay of the determination is lower compared with determination based on the lateral movement of monitoring target vehicle in the adjacent lane. Cut-in of the monitoring target vehicle is estimated based on the relative motion of the monitoring target vehicle relative to the flow of the adjacent lane. It is estimated that the monitoring target vehicle has moved into a cut-in posture based on the relative motion of the monitoring target vehicle relative to the own-vehicle. When cut-in of the monitoring target vehicle is estimated, the vehicle control device first executes the evasive preparation. Then, when it is estimated that the monitoring target vehicle has moved into a cut-in posture, the vehicle control device executes an evasive action. Through these actions at two stages, it is possible to avoid interference between the monitoring target vehicle cutting into the own-lane and the own-vehicle without providing discomfort to a passenger due to an early evasive action or an abrupt evasive action, thereby maintaining smooth traffic.

The evasive preparation execution unit may sense, as the predetermined relative motion of the monitoring target vehicle relative to the flow of the adjacent lane, acceleration of the monitoring target vehicle from a vehicle speed faster than a group vehicle speed of the adjacent lane, or deceleration of the monitoring target vehicle from a vehicle speed slower than the group vehicle speed of the adjacent lane.

The evasive preparation execution unit may sense, as the predetermined relative motion of the monitoring target vehicle relative to the flow of the adjacent lane, a longer inter-vehicular distance between the monitoring target vehicle and a front vehicle on the adjacent lane than a reference range, or the inter-vehicular distance shorter than the reference range.

The evasive action execution unit may sense, as the predetermined relative motion of the monitoring target vehicle relative to the own-vehicle, adjustment of a vehicle speed of the monitoring target vehicle to a vehicle speed of the own-vehicle by the monitoring target vehicle. The evasive action execution unit may sense, as the predetermined relative motion of the monitoring target vehicle relative to the own-vehicle, staying of the monitoring target vehicle at a constant inter-vehicular distance from the own-vehicle for a predetermined time or longer.

The vehicle control device may further comprise a side-by-side running avoidance control unit configured to control, when another vehicle staying in a side-by-side running determination region set on the adjacent lane for a side-by-side running determination time or longer is detected, driving of the own-vehicle to avoid side-by-side running with the other vehicle. If the vehicle control device comprises the side-by-side running avoidance control unit, the evasive preparation execution unit may execute, as the evasive preparation, increase of the side-by-side running determination region in a lane direction of the adjacent lane and reduction of the side-by-side running determination time when the predetermined relative motion of the monitoring target vehicle relative to the flow of the adjacent lane is sensed. And, the evasive action execution unit may sense, as the predetermined relative motion of the monitoring target vehicle relative to the own-vehicle, staying of the monitoring target vehicle in the side-by-side running determination region for the side-by-side running determination time or longer.

The monitoring target vehicle detection unit may detect, as the monitoring target vehicle, a vehicle traveling at a position diagonally in front of the own-vehicle on the adjacent lane. The monitoring target vehicle detection unit may detect, as the monitoring target vehicle, a vehicle traveling in a monitoring region set on the adjacent lane and including a position right beside the own-vehicle.

The evasive action execution unit may immediately execute the evasive action before execution of the evasive preparation when a vehicle approaches from behind on the adjacent lane at a vehicle speed faster than a group vehicle speed of the adjacent lane and a TTC (that is, Time To Collision) which is of the vehicle with a front vehicle on the adjacent lane becomes equal to or smaller than a predetermined value while an inter-vehicular distance between the own-vehicle and a preceding vehicle on the own-lane is longer than a first reference distance and an inter-vehicular distance between the own-vehicle and an adjacent preceding vehicle on the adjacent lane is longer than a second reference distance.

As described above, when cut-in of another vehicle traveling on an adjacent lane into the own-lane is estimated, a vehicle control device according to an example in the present disclosure first executes an evasive preparation. Then, when it is estimated that the other vehicle traveling on the adjacent lane has moved into a cut-in posture, the vehicle control device executes an evasive action. Through these actions at two stages, it is possible to avoid interference between the other vehicle cutting into the own-lane from the adjacent lane and the own-vehicle without providing discomfort to a passenger due to an early evasive action or an abrupt evasive action, thereby maintaining smooth traffic.

DESCRIPTION of EMBODIMENTS

The following describes embodiments of the present invention with reference to the accompanying drawings. However, when a value such as the number, quantity, amount, or range of each element is stated below in the embodiments, the present disclosure is not limited to the stated value except for a case in which the value is clearly indicated and a case in which the value is clearly specified in principle. In addition, an element such as a structure or a step described below in the embodiments is not necessarily essential to the present disclosure except for a case in which the element is clearly indicated and a case in which the element is clearly specified in principle.

1. First Embodiment

1-1. Vehicle Configuration

A vehicle control device according to the embodiment of the present disclosure achieves, for example, an automated driving level of Level 2 or higher in level definition by Society of Automotive Engineers (SAE). The vehicle control device according to the embodiment is included in a vehicle having a schematic configuration illustrated in FIG. 1.

Figure 1:
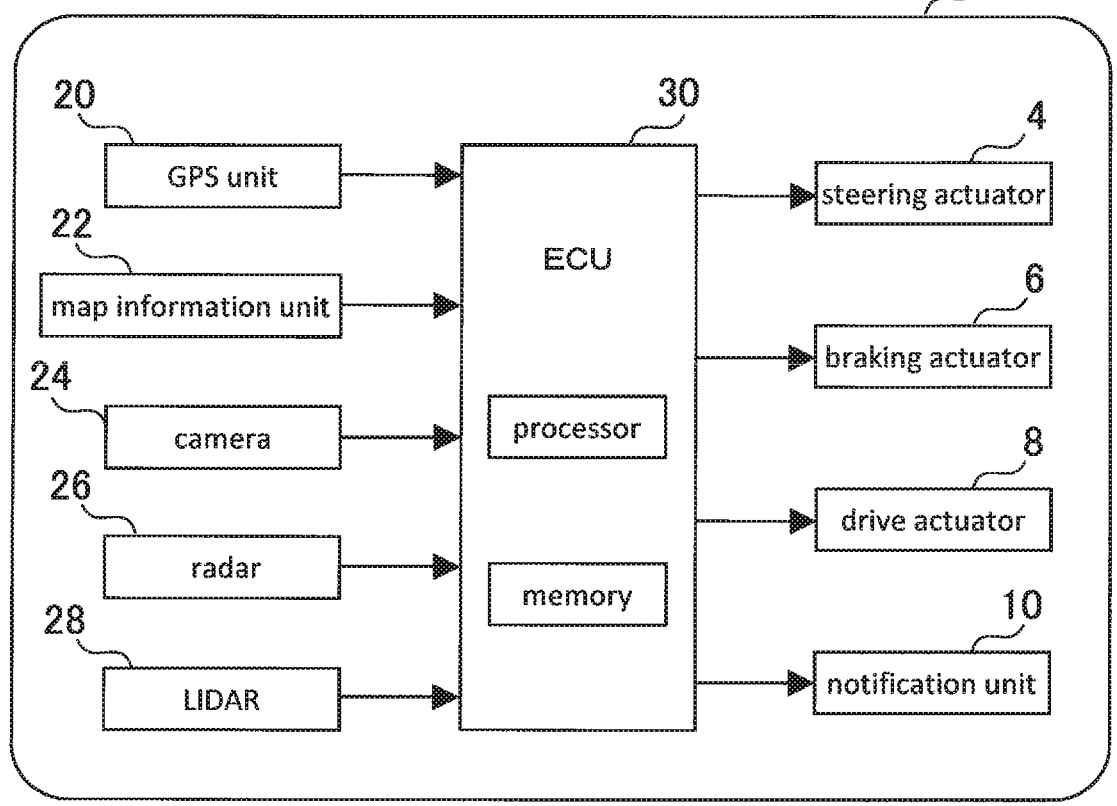
FIG. 1 is a view illustrating a schematic configuration of a vehicle in which a vehicle control device according to the first embodiment of the present disclosure is included.

As illustrated in FIG. 1, a vehicle 2 includes, as an acquirer of information for automated driving, a GPS unit 20, a map information unit 22, a camera 24, a radar 26, and an LIDAR 28. These components are electrically connected with an electronic control unit (hereinafter referred to as "ECU") 30 as the vehicle control device.

The GPS unit 20 acquires position information indicating the current position of an own-vehicle based on GPS signals. The ECU 30 can determine the current position of the vehicle 2 based on the position information provided from the GPS unit 20. The map information unit 22 is achieved in, for example, a storage such as an HDD or an SSD mounted on the vehicle. Map information stored in the map information unit 22 includes various kinds of information such as the position, shape, and lane structure of a road.

The camera 24 transmits, to the ECU 30, image information obtained through image capturing of the circumference of the vehicle 2. The ECU 30 performs well-known image processing on the image information transmitted from the camera 24 to recognize other vehicles around the vehicle 2 and road boundary lines including white lines. The radar 26 is a milliwave radar device mounted on the vehicle 2. The radar 26 transmits, to the ECU 30, other-vehicle information reflecting the position and speed of another vehicle relative to the vehicle 2. The LIDAR 28 is a laser imaging detection and ranging (LIDAR) device mounted on the vehicle 2. The LIDAR 28 transmits, to the ECU 30, other-vehicle information reflecting at least the position of another vehicle relative to the vehicle 2. The ECU 30 recognizes the relative position and relative speed of another vehicle or another object around the vehicle 2 based on the other-vehicle information transmitted from the radar 26 and the LIDAR 28.

The camera 24, the radar 26, and the LIDAR 28 are autonomous sensors configured to acquire information related to the situation outside the vehicle 2. The vehicle 2 includes, separately from these autonomous sensors 24, 26, and 28, a vehicle sensor (not illustrated) configured to acquire information related to the motion state of the vehicle 2. Examples of the vehicle sensor include a speed sensor configured to measure the traveling speed of the vehicle based on the rotational speed of a wheel, an acceleration sensor configured to measure the degree of acceleration acting on the vehicle, a yaw rate sensor configured to measure the rotational angular velocity of the vehicle, and a steering angle sensor configured to measure the steering angle.

The vehicle 2 includes a steering actuator 4 configured to steer the vehicle 2, a braking actuator 6 configured to decelerate the vehicle 2, and a drive actuator 8 configured to accelerate the vehicle 2. Examples of the steering actuator 4 include a power steering system, a steer-by-wire steering system, and a rear-wheel steering system. Examples of the braking actuator 6 include a hydraulic pressure brake, and an electrical power regenerative brake. Examples of the drive actuator 8 include an engine, an EV system, a hybrid system, and a fuel battery system.

The vehicle 2 includes a notification unit 10. The notification unit 10 is, for example, a display device visually recognizable from the outside, such as a direction indicator or a brake lamp. The notification unit 10 notifies information related to action determination of the vehicle 2 to other vehicles positioned around the vehicle 2 based on a control command value transmitted from the ECU 30.

The ECU 30 includes at least one processor and at least one memory. The memory stores various kinds of data including a map and various computer programs. Various functions of the ECU 30 are achieved when the computer programs stored in the memory are read and executed by the processor. The ECU 30 serving as the vehicle control device may be a set of a plurality of ECUs.

1-2. Functions of ECU as Vehicle Control Device

1-2-1. Details of ECU Functions

Figure 2:
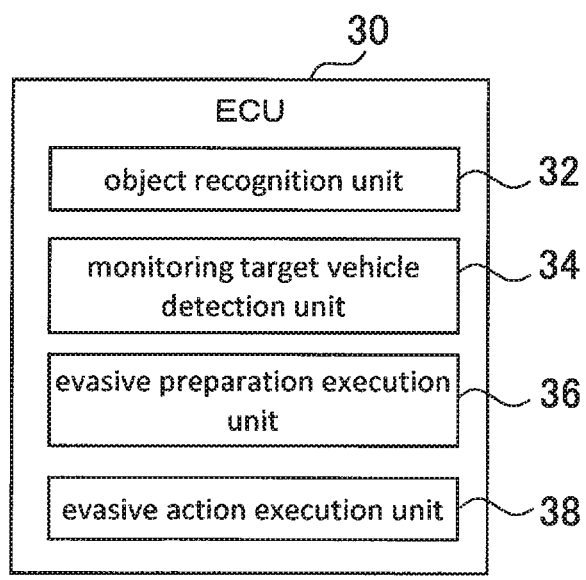
FIG. 2 is a block diagram illustrating part of the functions of the ECU as the vehicle control device according to the first embodiment of the present disclosure.

FIG. 2 is a block diagram illustrating part of the functions of the ECU 30 as the vehicle control device according to the present embodiment. FIG. 2 illustrates, in blocks, functions extracted from among the various kinds of functions of the ECU 30 and related to avoidance of interference with another vehicle cutting into an own-lane from an adjacent lane. The other various functions of the ECU 30 are not illustrated. The ECU 30 has the function of detecting a vehicle that may potentially cut into the own-lane from an adjacent lane, and determining an action to avoid interference based on the relative motion of the detected vehicle relative to the flow of the adjacent lane and the relative motion of the detected vehicle relative to the own-vehicle. This function is achieved by an object recognition unit 32, a monitoring target vehicle detection unit 34, an evasive preparation execution unit 36, and an evasive action execution unit 38 that are included in the ECU 30. However, these units are not provided as hardware in the ECU 30 but achieved as software when the computer programs stored in the memory are executed by the processor. The following describes the functions of the ECU 30 as the vehicle control device with reference to drawings.

The object recognition unit 32 recognizes an object around the own-vehicle based on information from the camera 24, the radar 26, or the LIDAR 28. The object recognition may be performed based on information from any one of these autonomous sensors 24, 26, and 28, or may be performed by sensor fusion in which information from a plurality of the autonomous sensors 24, 26, and 28 is combined. The object recognition determines the type of an object, for example, whether the object is a moving object or a stationary object. When the object is a moving object, the position and speed thereof are calculated. The position and speed of a moving object are calculated in, for example, a reference coordinate system with the own-vehicle as the origin, the width direction of the own-vehicle as the horizontal axis, and the traveling direction thereof as the vertical axis.

Figure 3:
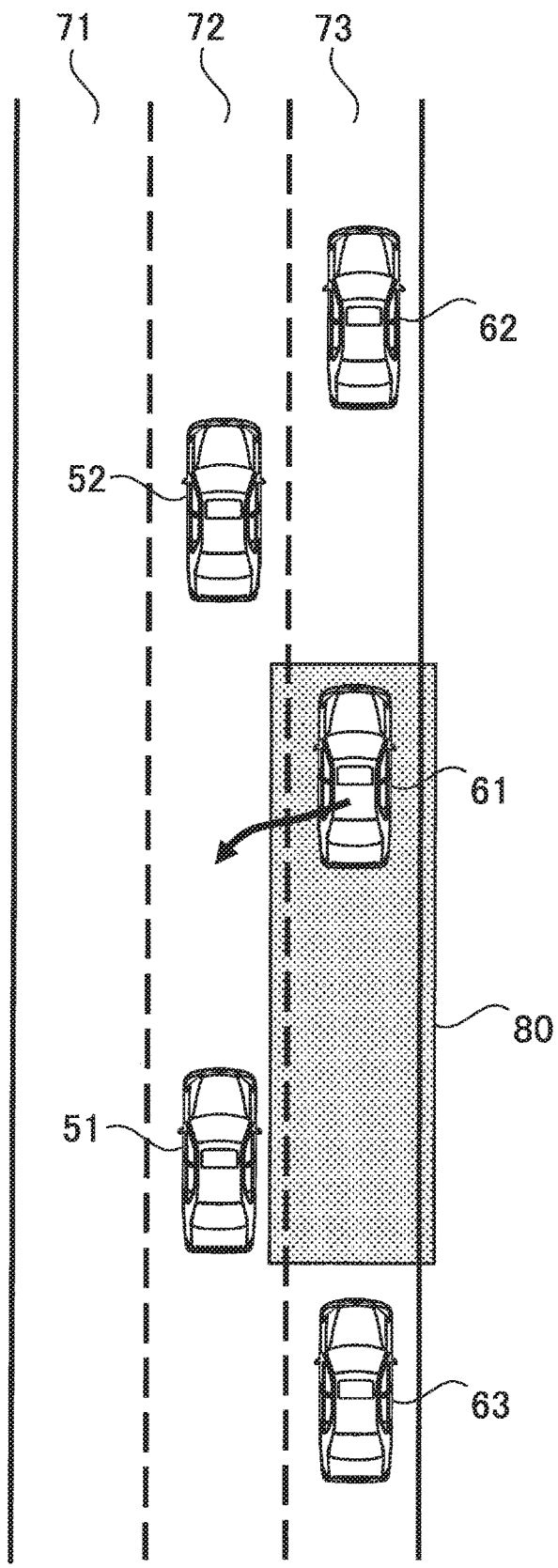
FIG. 3 is a view illustrating a situation in which another vehicle cuts into an own-lane from an adjacent lane.

The monitoring target vehicle detection unit 34 detects, among objects recognized by the object recognition unit 32, a monitoring target vehicle that may potentially cut into the own-lane from an adjacent lane. The following describes a specific example with reference to FIG. 3. FIG. 3 illustrates a situation in which, on a road including three lanes of a first driving lane 71, a second driving lane 72, and a passing lane 73 on one side, an own-vehicle 51 and a preceding vehicle 52 are traveling on the second driving lane 72, and three vehicles 61, 62, and 63 are traveling on the passing lane 73. The object recognition unit 32 recognizes the preceding vehicle 52 and the three vehicles 61, 62, and 63 on the passing lane 73. Among the vehicles recognized by the object recognition unit 32, the vehicle 61 may potentially change lanes from the passing lane 73 as an adjacent lane to the second driving lane 72 as the own-lane and cut in front of the own-vehicle 51 as illustrated with an arrow in FIG. 3.

The monitoring target vehicle detection unit 34 detects, as a monitoring target vehicle, the vehicle 61 travelling on the passing lane 73, in other words, the vehicle 61 traveling at a position diagonally in front of the own-vehicle 51. When a plurality of vehicles exist in a range diagonally in front of the own-vehicle 51, each of the plurality of vehicles may be detected as the monitoring target vehicle. A monitoring region 80 extending from a position right beside the own-vehicle 51 to the position diagonally in front of the own-vehicle 51 may be set on the passing lane 73 as the adjacent lane, and a vehicle traveling in the monitoring region 80 may be detected as the monitoring target vehicle. The size of the monitoring region 80 may be increased or decreased in accordance with the group vehicle speed of vehicles travelling on the passing lane 73.

The evasive preparation execution unit 36 senses a predetermined relative motion of the monitoring target vehicle detected by the monitoring target vehicle detection unit 34 relative to the flow of the adjacent lane. It is known that an adjacent vehicle cutting into the own-lane performs a characteristic motion in the flow direction of the adjacent lane before starting lateral movement to the own-lane. The characteristic motion can be sensed as the predetermined relative motion relative to the flow of the adjacent lane.

Since an early evasive action and an abrupt evasive action provide discomfort to a passenger, when having sensed the predetermined relative motion relative to the flow of the adjacent lane, the ECU 30 first executes an evasive preparation for cut-in of the monitoring target vehicle at the evasive preparation execution unit 36. The specific contents of the evasive preparation will be described below in detail. The following describes, with a specific example, a relative motion as a condition for execution of the evasive preparation.

Figure 4:
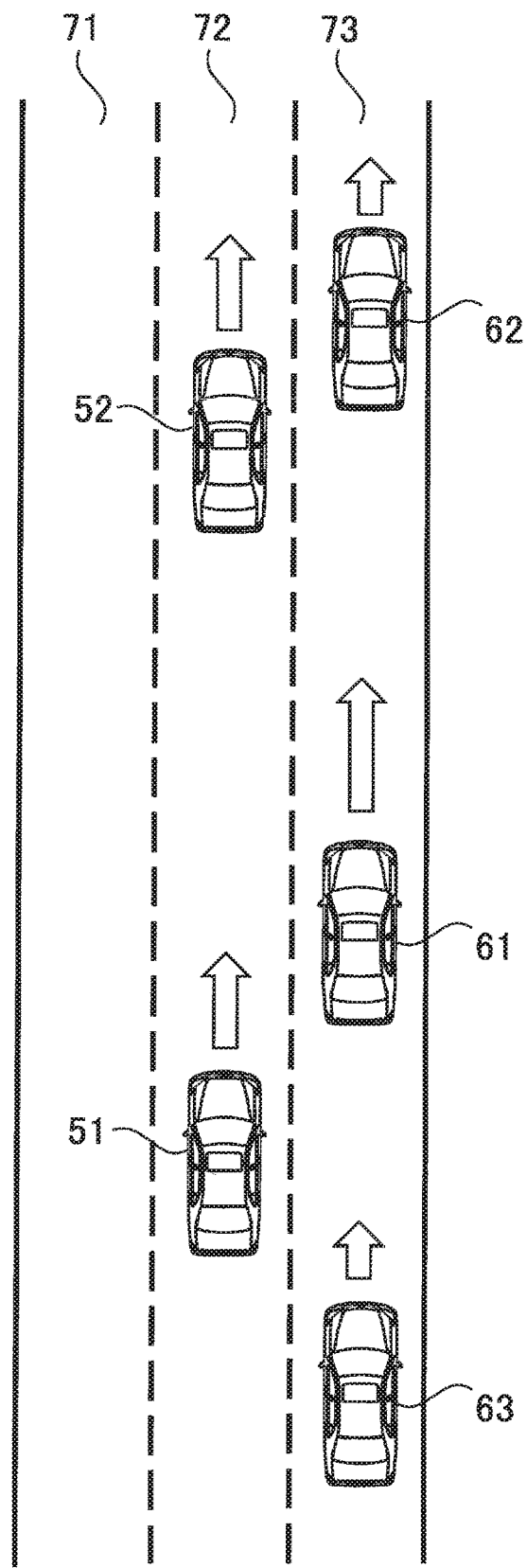
FIG. 4 is a view illustrating an example of relative motion of a monitoring target vehicle relative to the flow of the adjacent lane, which causes to execute an evasive preparation.
Figure 5:
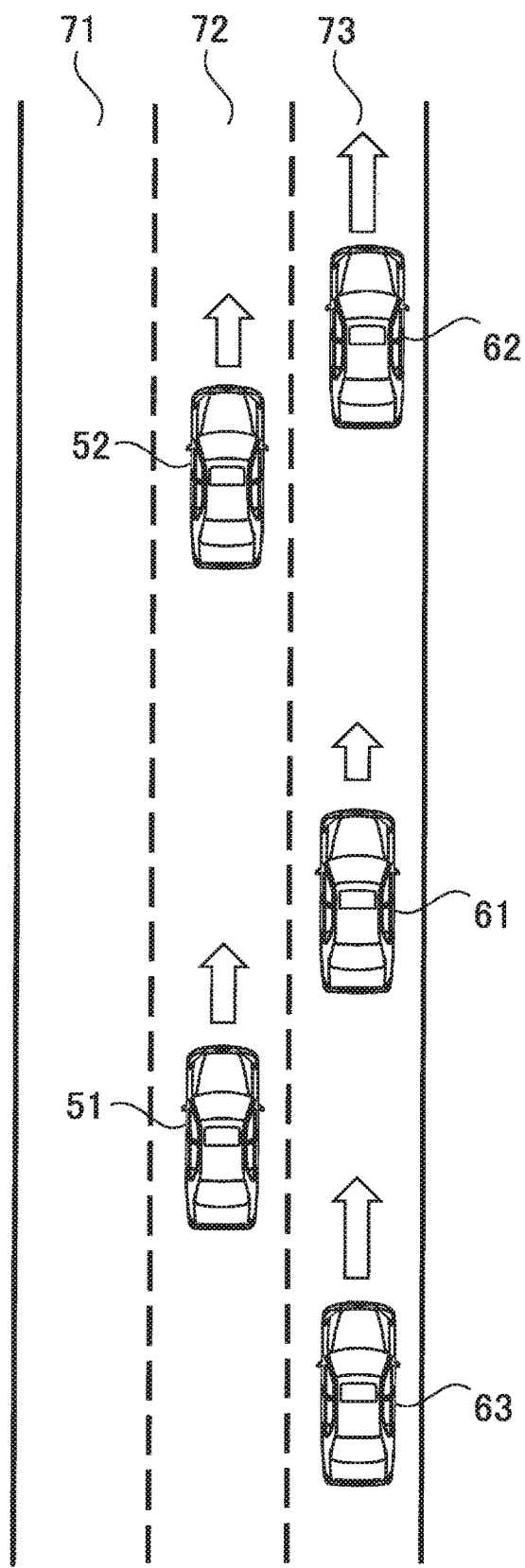
FIG. 5 is a view illustrating an example of relative motion of a monitoring target vehicle relative to the flow of the adjacent lane, which causes to execute an evasive preparation.

FIGS. 4 and 5 each illustrate a situation in which the own-vehicle 51 and the preceding vehicle 52 are traveling on the own-lane 72, and the three vehicles 61, 62, and 63 are traveling on the adjacent lane 73. In FIGS. 4 and 5, the length of each arrow represents the vehicle speed of the corresponding vehicle.

In the example illustrated in FIG. 4, the monitoring target vehicle is the vehicle 61 traveling at a position diagonally in front of the own-vehicle 51, and the vehicle speed of the monitoring target vehicle 61 is faster than the group vehicle speed of the adjacent lane 73, in other words, the average vehicle speed of vehicles traveling on the adjacent lane 73. In this state, when the monitoring target vehicle 61 has accelerated, it is highly likely that the monitoring target vehicle 61 is about to cut in front of the own-vehicle 51. Thus, the evasive preparation execution unit 36 senses, as the predetermined relative motion of the monitoring target vehicle 61 relative to the flow of the adjacent lane 73, the acceleration of the monitoring target vehicle 61 from a vehicle speed faster than the group vehicle speed of the adjacent lane 73. Cut-in in this case is thought to be likely to occur when the group vehicle speed of the adjacent lane 73 is slower than the vehicle speed of the own-vehicle 51.

In the example illustrated in FIG. 5, the monitoring target vehicle is the vehicle 61 traveling at a position diagonally in front of the own-vehicle 51, and the vehicle speed of the monitoring target vehicle 61 is slower than the group vehicle speed of the adjacent lane 73, in other words, the average vehicle speed of vehicles traveling on the adjacent lane 73. In this state, when the monitoring target vehicle 61 has decelerated, it is highly likely that the monitoring target vehicle 61 is about to cut in front of the own-vehicle 51. Thus, the evasive preparation execution unit 36 senses, as the predetermined relative motion of the monitoring target vehicle 61 relative to the flow of the adjacent lane 73, the deceleration of the monitoring target vehicle 61 from a vehicle speed slower than the group vehicle speed of the adjacent lane 73. Cut-in in this case is thought to be likely to occur when the group vehicle speed of the adjacent lane 73 is faster than the vehicle speed of the own-vehicle 51.

Figure 6:
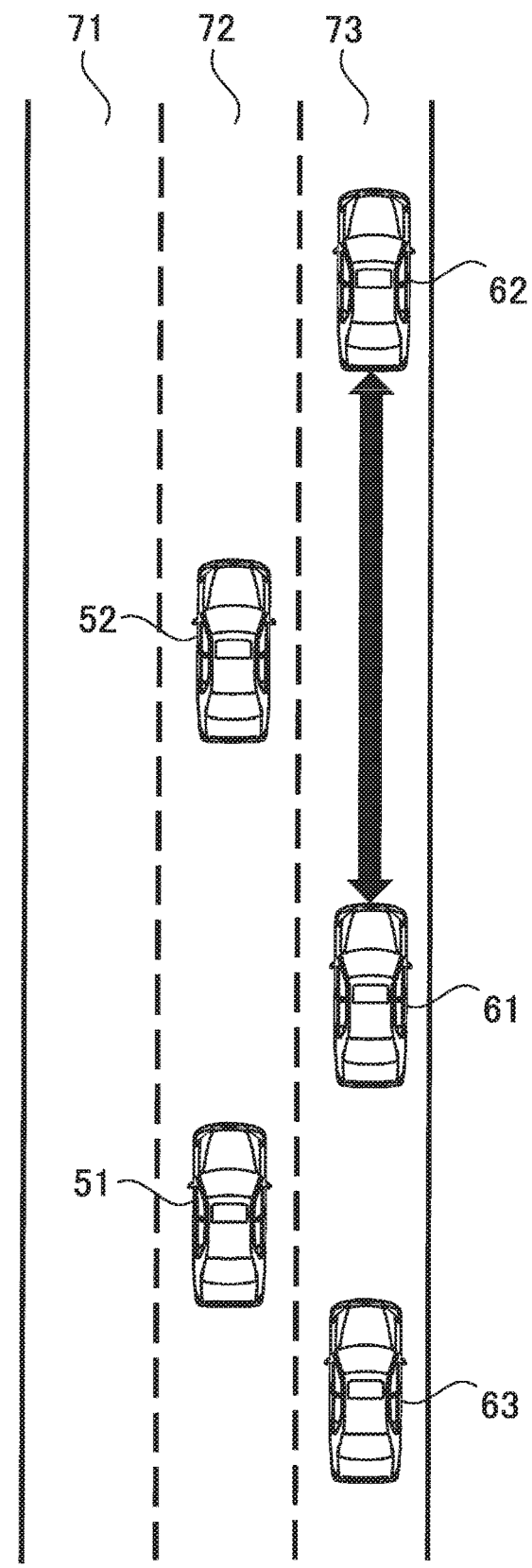
FIG. 6 is a view illustrating an example of relative motion of a monitoring target vehicle relative to the flow of the adjacent lane, which causes to execute an evasive preparation.
Figure 7:
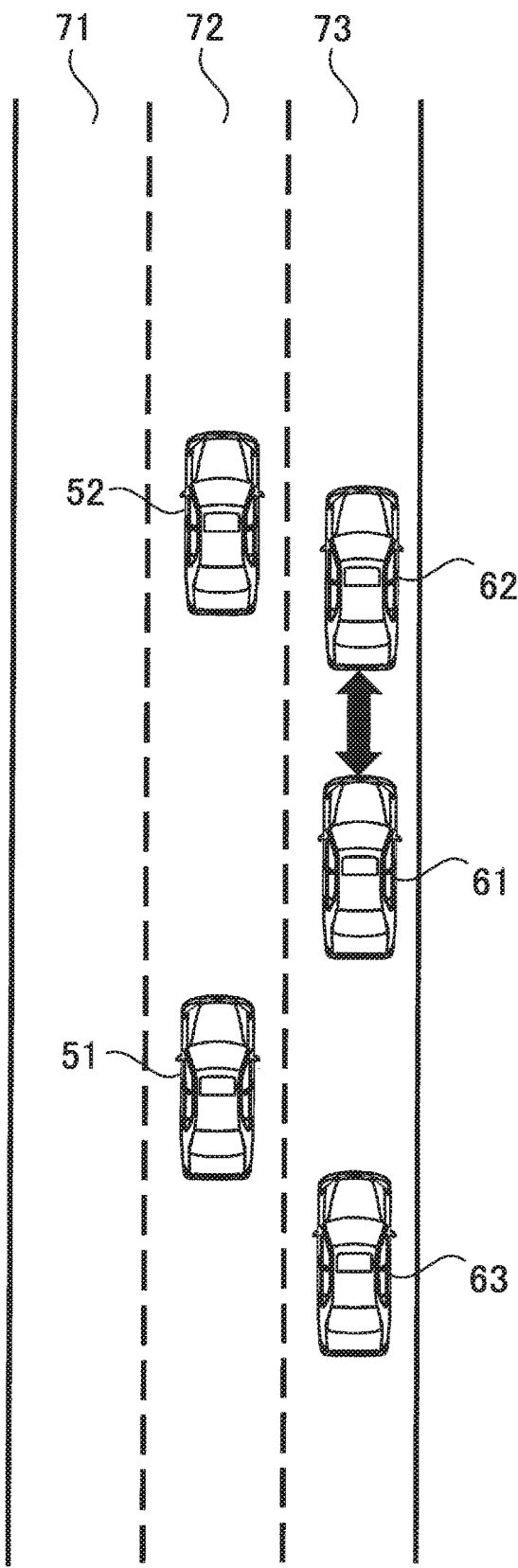
FIG. 7 is a view illustrating an example of relative motion of a monitoring target vehicle relative to the flow of the adjacent lane, which causes to execute an evasive preparation.

FIGS. 6 and 7 each illustrate a situation in which the own-vehicle 51 and the preceding vehicle 52 are traveling on the own-lane 72, and the three vehicles 61, 62, and 63 are traveling on the adjacent lane 73. In FIGS. 6 and 7, the length of each double-headed arrow represents the inter-vehicular distance between the monitoring target vehicle 61 and the front vehicle 62 ahead of the monitoring target vehicle 61.

In the example illustrated in FIG. 6, the monitoring target vehicle is the vehicle 61 traveling at a position diagonally in front of the own-vehicle 51, and the monitoring target vehicle 61 has a longer inter-vehicular distance from the front vehicle 62. The inter-vehicular distance has an appropriate range for collision prevention and smooth traffic. The appropriate range is stored as a reference range in the ECU 30. However, the reference range varies with the vehicle speed of the monitoring target vehicle 61, and is set to be larger at a longer distance from the monitoring target vehicle 61 for a faster vehicle speed. Typically, the driver avoids a too long inter-vehicular distance from the front vehicle in order not to disturb traffic flow or allow cut-in from an adjacent lane. This indicates that, when the monitoring target vehicle 61 has an inter-vehicular distance longer than the reference range, it is highly likely that the monitoring target vehicle 61 is about to cut in front of the own-vehicle 51. Thus, the evasive preparation execution unit 36 senses, as the predetermined relative motion of the monitoring target vehicle 61 relative to the flow of the adjacent lane 73, a longer inter-vehicular distance between the monitoring target vehicle 61 and the front vehicle 62 than the reference range.

In the example illustrated in FIG. 7, the monitoring target vehicle is the vehicle 61 traveling at a position diagonally in front of the own-vehicle 51, and the monitoring target vehicle 61 has a shorter inter-vehicular distance from the front vehicle 62. Typically, the driver avoids a too short inter-vehicular distance from the front vehicle in order to prevent collision. This indicates that, when the monitoring target vehicle 61 has the inter-vehicular distance shorter than the reference range, it is highly likely that the monitoring target vehicle 61 is about to cut in front of the own-vehicle 51. Thus, the evasive preparation execution unit 36 senses, as the predetermined relative motion of the monitoring target vehicle 61 relative to the flow of the adjacent lane 73, the inter-vehicular distance between the monitoring target vehicle 61 and the front vehicle 62 shorter than the reference range.

When it is estimated that the monitoring target vehicle has moved into a cut-in posture after execution of the evasive preparation by the evasive preparation execution unit 36, the evasive action execution unit 38 executes an evasive action to avoid interference between the monitoring target vehicle and the own-vehicle. The movement of the monitoring target vehicle into the cut-in posture can be sensed as the predetermined relative motion of the monitoring target vehicle relative to the own-vehicle. When cut-in of the monitoring target vehicle to the own-lane is estimated, the evasive preparation is executed first. Then, when it is estimated that the monitoring target vehicle has moved into the cut-in posture, the evasive action is executed. Through these actions at two stages, it is possible to avoid interference between the monitoring target vehicle cutting in and the own-vehicle without providing discomfort to a passenger due to an early evasive action or an abrupt evasive action. The specific contents of the evasive action will be described below in detail. The following describes, with a specific example, a relative motion as a condition for execution of the evasive action.

Figure 8:
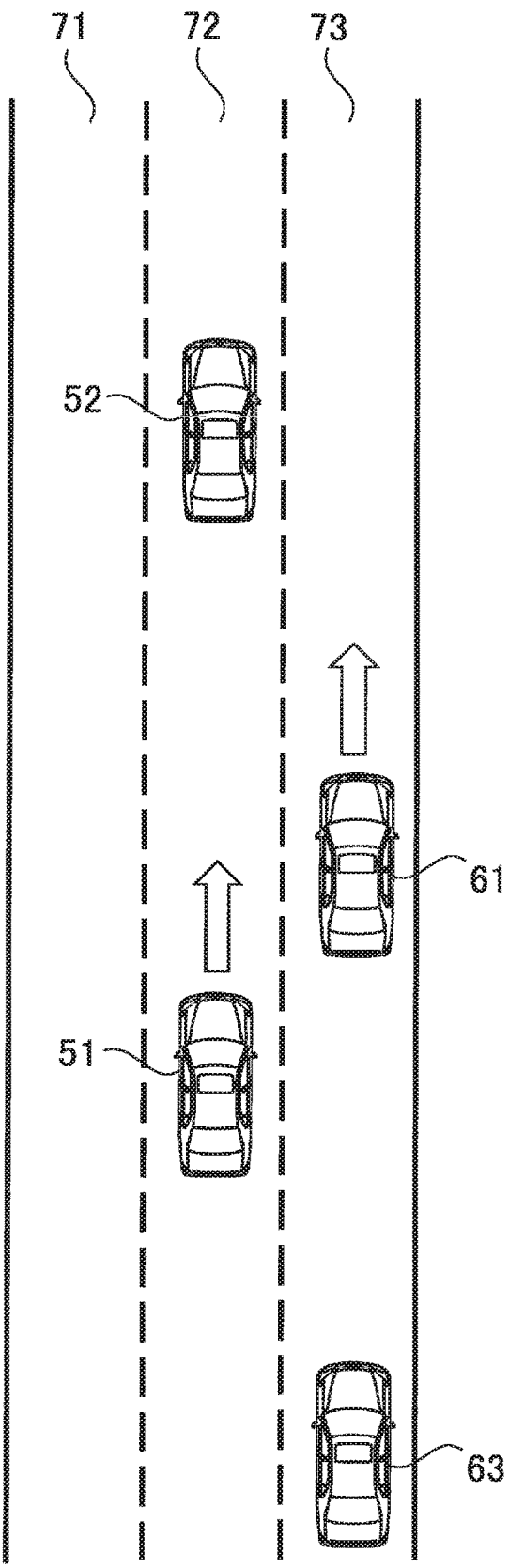
FIG. 8 is a view illustrating an example of relative motion of the monitoring target vehicle relative to the own-vehicle, which causes to execute an evasive action after executing the evasive preparation.

FIG. 8 illustrates a situation in which the own-vehicle 51 and the preceding vehicle 52 are traveling on the own-lane 72 and the two vehicles 61 and 63 are traveling on the adjacent lane 73. In FIG. 8, the length of each arrow represents the vehicle speed of the corresponding vehicle. In the example illustrated in FIG. 8, the monitoring target vehicle is the vehicle 61 traveling at a position diagonally in front of the own-vehicle 51, and the vehicle speed of the monitoring target vehicle 61 is substantially equal to the vehicle speed of the own-vehicle 51. When the monitoring target vehicle 61 has adjusted its vehicle speed to the vehicle speed of the own-vehicle 51, it is thought that the monitoring target vehicle 61 has moved into a posture for cutting in front of the own-vehicle 51. Thus, the evasive action execution unit 38 senses, as the predetermined relative motion of the monitoring target vehicle 61 relative to the own-vehicle 51, adjustment of the vehicle speed of the monitoring target vehicle 61 to the vehicle speed of the own-vehicle 51 by the monitoring target vehicle 61. More specifically, when the ratio of the vehicle speed difference between the own-vehicle 51 and the monitoring target vehicle 61 relative to the vehicle speed of the own-vehicle 51 has become equal to or smaller than a predetermined value, it is determined that the monitoring target vehicle 61 has adjusted its vehicle speed to the vehicle speed of the own-vehicle 51.

Figure 9:
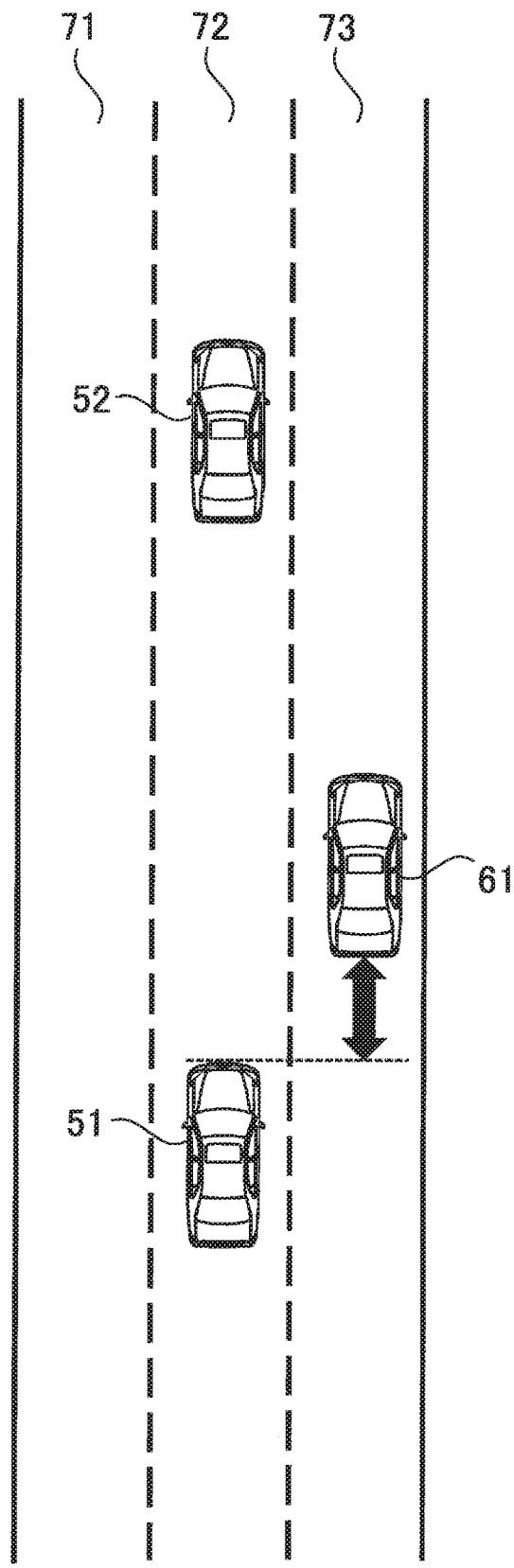
FIG. 9 is a view illustrating an example of relative motion of the monitoring target vehicle relative to the own-vehicle, which causes to execute an evasive action after executing the evasive preparation.

FIG. 9 illustrates a situation in which the own-vehicle 51 and the preceding vehicle 52 are traveling on the own-lane 72 and the monitoring target vehicle 61 is traveling on the adjacent lane 73. In FIG. 9, the length of a double-headed arrow represents the inter-vehicular distance between the own-vehicle 51 and the monitoring target vehicle 61. The inter-vehicular distance between the own-vehicle 51 and a vehicle traveling on the adjacent lane 73 normally changes with time due to the vehicle speed difference between the own-lane 72 and the adjacent lane 73. However, when the monitoring target vehicle 61 is staying at a constant inter-vehicular distance from the own-vehicle for a certain time, it is thought that the monitoring target vehicle 61 has moved into a posture for cutting in front of the own-vehicle 51. Thus, the evasive action execution unit 38 senses, as the predetermined relative motion of the monitoring target vehicle 61 relative to the own-vehicle 51, staying of the monitoring target vehicle 61 at a constant inter-vehicular distance from the own-vehicle 51 for a predetermined time.

Figure 10:
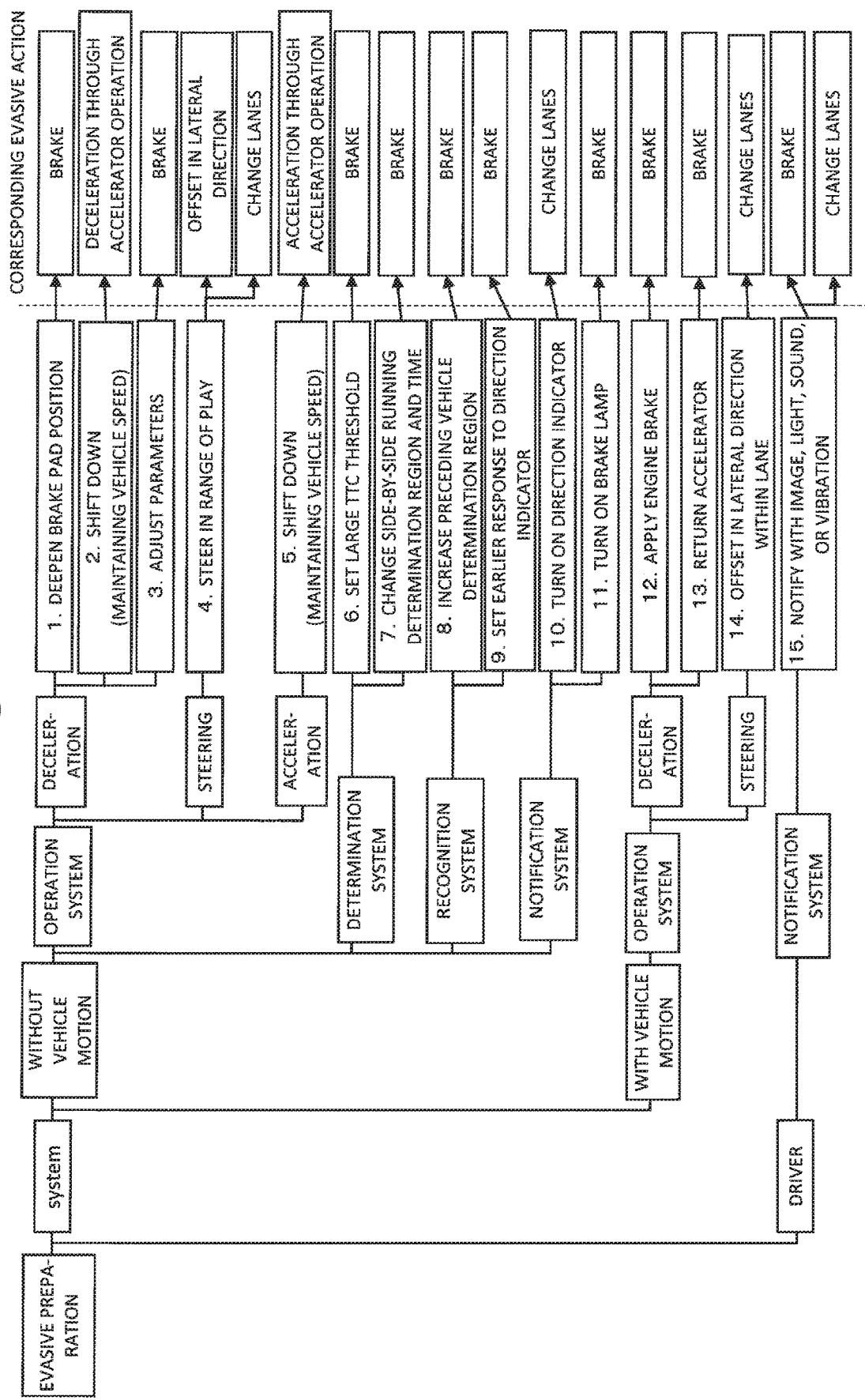
FIG. 10 is a diagram illustrating exemplary evasive preparations and the corresponding evasive actions executed by the vehicle control device according to the first embodiment of the present disclosure.

The following describes the specific contents of each of the evasive preparation and the evasive action with reference to FIG. 10. FIG. 10 illustrates exemplary evasive preparations executed by the ECU 30 as the vehicle control device, and the corresponding evasive actions. The evasive preparations include those performed for a system and those performed for the driver. The evasive preparations performed for the system include those involving no vehicle motion and those involving a vehicle motion. The evasive preparations involving no vehicle motion include those for an operation system, those for a determination system, those for a recognition system, and those for a notification system. The evasive preparations for the operation system include those related to deceleration, those related to steering, and those related to acceleration. The evasive preparations involving a vehicle motion are performed for the operation system, and include those related to deceleration and those related to steering. The evasive preparations performed for the driver are performed for the notification system. According to the above-described classification, 15 kinds of first to fifteenth evasive preparations are exemplarily provided as illustrated in FIG. 10.

The first exemplary evasive preparation illustrated in FIG. 10 is deepening of the position of the brake pad, and the corresponding evasive action is braking. When the position of the brake pad is deepened in advance, swift braking is possible.

The second exemplary evasive preparation is downshift while maintaining the vehicle speed, and the corresponding evasive action is deceleration through an accelerator operation. When downshift is performed in advance, deceleration can be immediately performed by operating the accelerator to the returning side.

The third exemplary evasive preparation is adjustment of parameters of brake control in advance, and the corresponding evasive action is braking. For example, when a target brake pressure is set to be large, swift braking is possible.

The fourth exemplary evasive preparation is steering in the range of play of the steering system in advance, and the corresponding evasive action is offsetting in the lateral direction within the own-lane or lane change. When steering is performed in the range of play of the steering system in advance, the direction of the vehicle can be swiftly changed.

The fifth exemplary evasive preparation is downshift while maintaining the vehicle speed, and the corresponding evasive action is acceleration through an accelerator operation. When downshift is performed in advance, acceleration can be immediately performed by operating the accelerator to the pressing side.

The sixth exemplary evasive preparation is setting of a large threshold of TTC with a front vehicle of the monitoring target vehicle on an adjacent lane, and the corresponding evasive action is braking. However, in this case, the predetermined relative motion of the monitoring target vehicle relative to the own-vehicle is not sensed, but the evasive action is executed when it is sensed that the TTC has become equal to or shorter than the threshold.

The seventh exemplary evasive preparation is increase of a side-by-side running determination region related to side-by-side running avoidance control and reduction of a side-by-side running determination time. This will be described below in detail in a second embodiment to be described later.

The eighth exemplary evasive preparation is increase of a preceding vehicle determination region, and the corresponding evasive action is braking. The preceding vehicle determination region is a region in which a vehicle positioned in front of the own-vehicle is determined as a preceding vehicle on the own-lane. In this case, entry of the monitoring target vehicle to the preceding vehicle determination region is sensed as the predetermined relative motion of the monitoring target vehicle relative to the own-vehicle.

The ninth exemplary evasive preparation is setting of an earlier response to the direction indicator of the monitoring target vehicle, and the corresponding evasive action is braking. In this case, flashing of the direction indicator of the monitoring target vehicle is sensed as the predetermined relative motion of the monitoring target vehicle relative to the own-vehicle.

The tenth and eleventh exemplary evasive preparations are not preparations for avoiding interference between the monitoring target vehicle cutting into the own-lane and the own-vehicle, but preparations for avoiding interference between the own-vehicle and a vehicle nearby that would occur as a result of the evasive action. Specifically, the tenth exemplary evasive preparation is turning-on of the direction indicator of the own-vehicle, and the corresponding evasive action is lane change. The eleventh exemplary evasive preparation is turning-on of the brake lamp of the own-vehicle, and the corresponding evasive action is braking. When the direction indicator and the brake lamp are turned on early before the evasive action, interference between the own-vehicle and a vehicle nearby can be avoided at the evasive action.

The twelfth exemplary evasive preparation is application of engine braking, and the corresponding evasive action is braking. When engine braking is applied in advance, the degree of deceleration at braking can be increased.

The thirteenth exemplary evasive preparation is returning of the accelerator, and the corresponding evasive action is braking. When the accelerator is returned in advance, the degree of deceleration at braking can be increased.

The fourteenth exemplary evasive preparation is offsetting in the lateral direction in the own-lane, and the corresponding evasive action is lane change. When offsetting in the lateral direction is performed in advance, lane change to the next lane can be performed swiftly.

The fifteenth exemplary evasive preparation is not a preparation for avoiding interference between the monitoring target vehicle cutting into the own-lane and the own-vehicle, but a preparation for avoiding discomfort of the driver due to the evasive action. Specifically, the fifteenth exemplary evasive preparation is notification to the driver with an image, light, sound, or vibration, and the corresponding evasive action is braking or lane change. When the likelihood of cut-in of another vehicle from an adjacent lane is notified to the driver in advance, discomfort of the driver due to the evasive action can be reduced.

Figure 11:
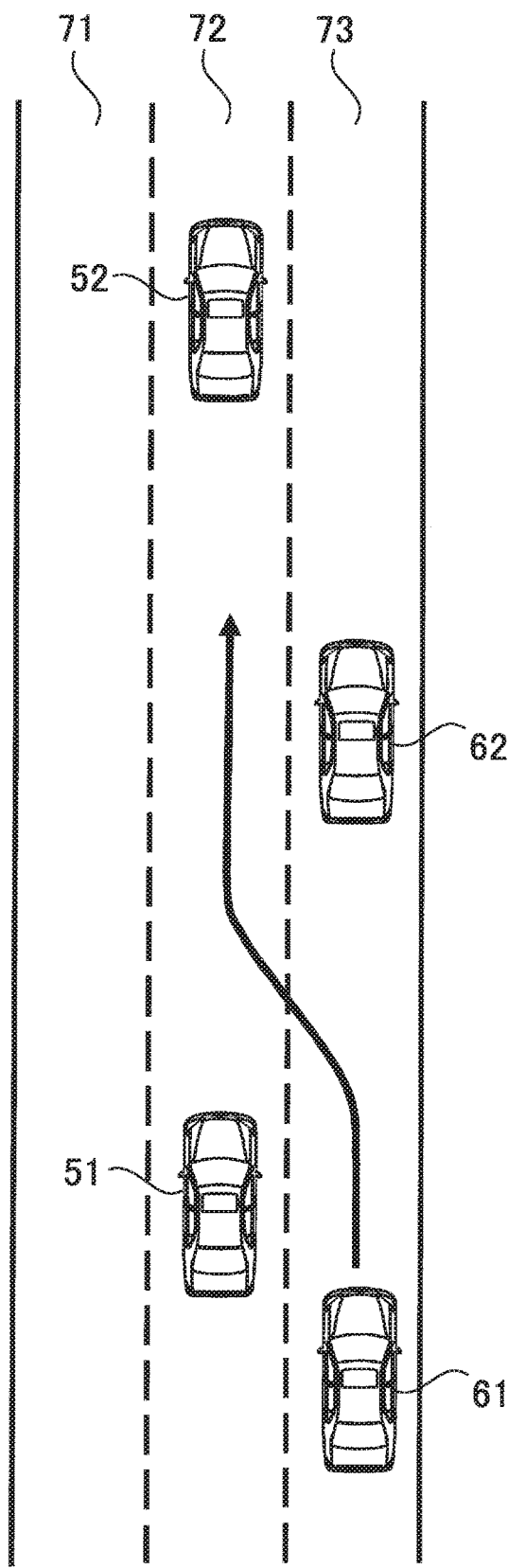
FIG. 11 is a view illustrating an example of the motion of the monitoring target vehicle, which cause to execute an evasive action without waiting for execution of an evasive preparation.

The above-description is made on the specific contents of each of the evasive preparation and the evasive action. As described above, the ECU 30 as the vehicle control device executes the evasive preparation when having sensed the predetermined relative motion of the monitoring target vehicle relative to the flow of the adjacent lane, and executes the evasive action when having sensed the predetermined relative motion of the monitoring target vehicle relative to the own-vehicle. However, depending on a scene, it is preferable to execute the evasive action without waiting for execution of the evasive preparation. FIG. 11 is a diagram for specific description of such a scene.

FIG. 11 illustrates a situation in which the own-vehicle 51 and the preceding vehicle 52 are traveling on the own-lane 72 and the two vehicles 61 and 62 are traveling on the adjacent lane 73. In the example illustrated in FIG. 11, the inter-vehicular distance between the own-vehicle 51 and the preceding vehicle 52 is longer than a first reference distance and the inter-vehicular distance between the own-vehicle 51 and the adjacent preceding vehicle 62 on the adjacent lane 73 is longer than a second reference distance. The second reference distance is an inter-vehicular distance sufficient for another vehicle to cut in between the own-vehicle 51 and the adjacent preceding vehicle 62. The first reference distance is an inter-vehicular distance sufficient for the other vehicle cutting in to avoid collision with the preceding vehicle 52.

In such a situation, it is assumed that, as illustrated with an arrow in FIG. 11, the vehicle 61 approaches from behind on the adjacent lane 73 at a vehicle speed faster than the group vehicle speed of the adjacent lane 73. In this case, the evasive action execution unit 38 continuously calculates the TTC of the vehicle 61 with the front vehicle 62 on the adjacent lane 73. When the TTC has become equal to or shorter than a predetermined value, the evasive action execution unit 38 immediately executes the evasive action without waiting for execution of the evasive preparation. Interference with a vehicle can be avoided by performing such processing when the vehicle is cutting in from behind.

1-2-2. Avoidance Control

Figure 12:
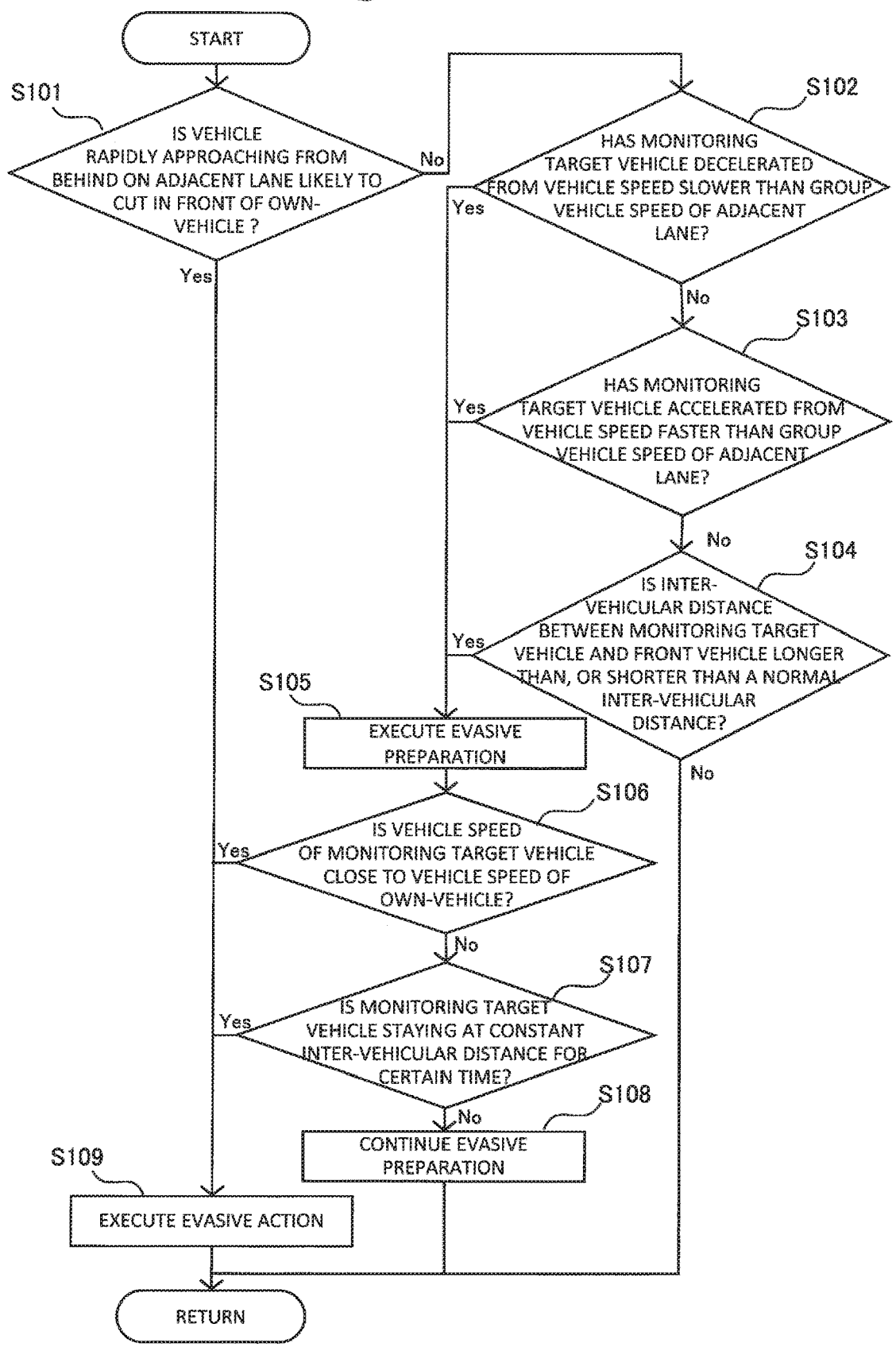
FIG. 12 is a flowchart illustrating the routine of the avoidance control executed by the vehicle control device according to the first embodiment of the present disclosure.

The above-described functions of the ECU 30 as the vehicle control device are used in avoidance control for cut-in of another vehicle from an adjacent lane. FIG. 12 is a flowchart illustrating the routine of the avoidance control executed by the ECU 30. The ECU 30 repeatedly executes the routine illustrated in FIG. 12 in a predetermined control period. The following sequentially describes the contents of the routine of the avoidance control starting at step S101.

At step S101, it is determined whether a vehicle rapidly approaching from behind on an adjacent lane is likely to cut in front of the own-vehicle. Specifically, it is determined that the cut-in is likely when four conditions are all satisfied. The four conditions are as follows: the inter-vehicular distance between the own-vehicle and a preceding vehicle on the own-lane is longer than the first reference distance (first condition); the inter-vehicular distance between the own-vehicle and an adjacent preceding vehicle on the adjacent lane is longer than the second reference distance (second condition); a vehicle is approaching from behind on the adjacent lane at a vehicle speed faster than the group vehicle speed of the adjacent lane (third condition); and the TTC of the approaching vehicle with a front vehicle on the adjacent lane has become equal to or shorter than a predetermined value (fourth condition).

When it is determined that the cut-in is likely at step S101, the evasive action is immediately executed at step S109. In this case, the evasive preparation is not executed. No limitation is placed on the contents of the evasive action. Any of the evasive actions exemplarily illustrated in FIG. 10 may be executed.

When a result of the determination at step S101 is negative, determination at step S102 is performed. At step S102, it is determined whether the monitoring target vehicle has decelerated from a vehicle speed slower than the group vehicle speed of the adjacent lane. Detection of the monitoring target vehicle is performed by a routine different from the present routine. When a result of the determination at step S102 is positive, the present routine proceeds to step S105 to execute the evasive preparation. At step S105, any of the evasive preparations exemplarily illustrated in FIG. 10 may be executed except for the sixth and seventh evasive preparations.

When the result of the determination at step S102 is negative, determination at step S103 is performed. At step S103, it is determined whether the monitoring target vehicle has accelerated from a vehicle speed faster than the group vehicle speed of the adjacent lane. When a result of the determination at step S103 is positive, the present routine proceeds to step S105 to execute the evasive preparation.

When the result of the determination at step S103 is negative, determination at step S104 is performed. At step S104, it is determined whether the inter-vehicular distance between the monitoring target vehicle and the front vehicle on the adjacent lane is shorter than, or longer than a normal inter-vehicular distance. When a result of the determination at step S104 is positive, the present routine proceeds to step S105 to execute the evasive preparation. When the result of the determination at step S104 is negative, the present routine directly ends.

After the evasive preparation is executed at step S105, determination at step S106 is performed. At step S106, it is determined whether the vehicle speed of the monitoring target vehicle is close to the vehicle speed of the own-vehicle, in other words, whether the monitoring target vehicle has adjusted its vehicle speed to the vehicle speed of the own-vehicle. When a result of the determination at step S106 is positive, the present routine proceeds to step S109 to execute the evasive action, which ends the present routine. The evasive action corresponding to the evasive preparation executed at step S105 is executed in accordance with the combinations illustrated in FIG. 10.

When the result of the determination at step S106 is negative, determination at step S107 is performed. At step S107, it is determined whether the monitoring target vehicle is staying at a constant inter-vehicular distance from the own-vehicle for a certain time. When a result of the determination at step S107 is positive, the present routine proceeds to step S109 to execute the evasive action, which ends the present routine. The evasive action corresponding to the evasive preparation executed at step S105 is executed in accordance with the combinations illustrated in FIG. 10. When the result of the determination at step S107 is negative, the evasive preparation is continued at step S108, and then the present routine ends.

2. Second Embodiment 2-1. Vehicle Configuration

A vehicle to which a vehicle control device according to the present embodiment is applied has a schematic configuration that is identical to that in the first embodiment illustrated in FIG. 1. Thus, description of the vehicle configuration will be omitted.

2-2. Functions of ECU as Vehicle Control Device 2-2-1. Details of ECU Functions

Figure 13:
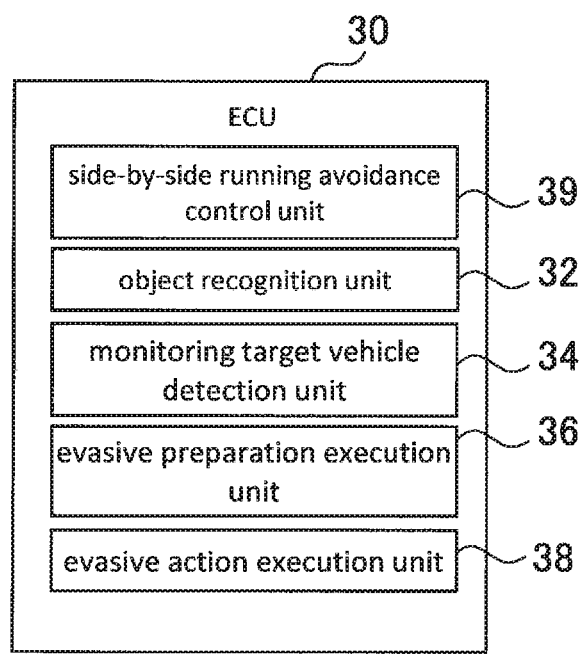
FIG. 13 is a block diagram illustrating part of the functions of the ECU as the vehicle control device according to the second embodiment of the present disclosure.

FIG. 13 is a block diagram illustrating part of the functions of the ECU 30 as the vehicle control device according to the present embodiment. In the present embodiment, the ECU 30 has, in addition to the functions of the ECU 30 in the first embodiment, the function of avoiding side-by-side running with another vehicle traveling on an adjacent lane so that the own-vehicle does not enter a blind spot of the other vehicle. This function is achieved by a side-by-side running avoidance control unit 39 included in the ECU 30.

The side-by-side running avoidance control unit 39 sets the side-by-side running determination region on the adjacent lane with reference to the own-vehicle, and determines whether another vehicle traveling on the adjacent lane is staying in the side-by-side running determination region for a certain time or longer. When another vehicle staying in the side-by-side running determination region for the certain time or longer is detected, the side-by-side running avoidance control unit 39 controls driving of the own-vehicle to avoid side-by-side running with the other vehicle. An action for avoiding side-by-side running may be lane change, deceleration, or acceleration. An optimum action is selected to avoid interference with another vehicle around the own-vehicle. The following describes a specific example of the side-by-side running avoidance control with reference to FIG. 14.

Figure 14:
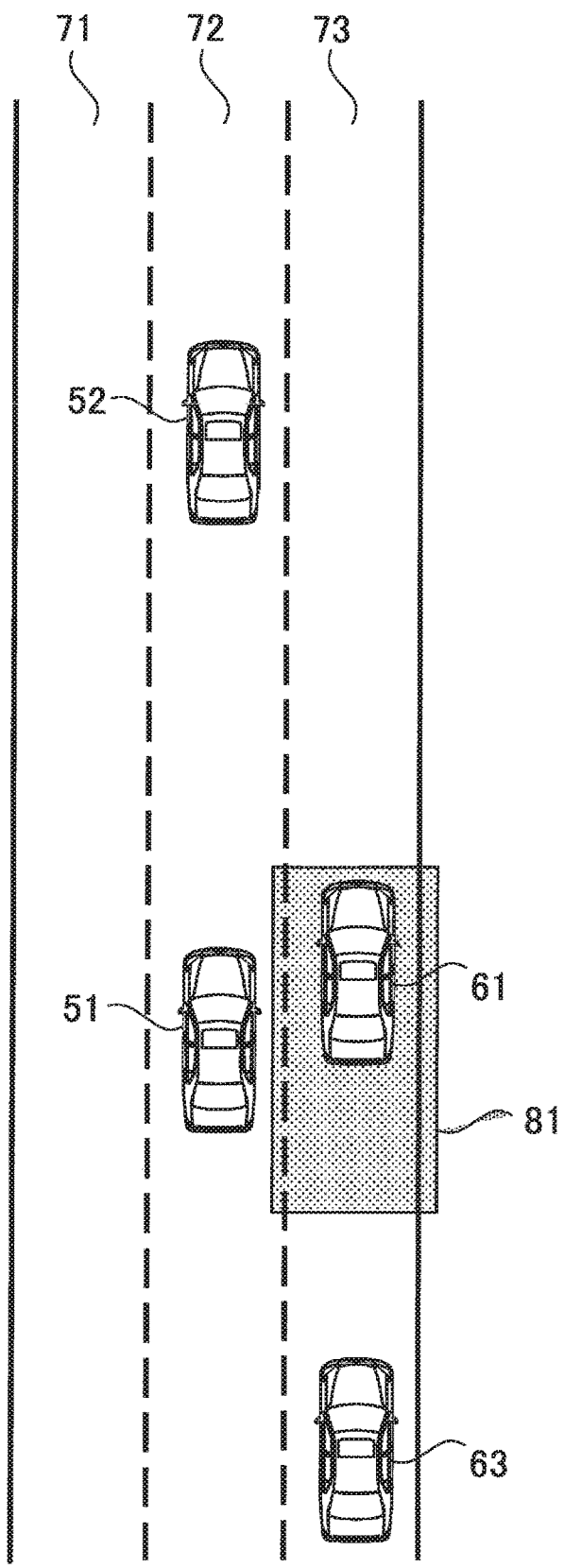
FIG. 14 is a view illustrating side-by-side running avoidance control executed by the vehicle control device according to the second embodiment of the present disclosure.

FIG. 14 illustrates a situation in which the own-vehicle 51 and the preceding vehicle 52 are traveling on the own-lane 72 and the two vehicles 61 and 63 are traveling on the adjacent lane 73. In the example illustrated in FIG. 14, the side-by-side running determination region is a region 81 surrounded by a rectangle set on the adjacent lane 73 as a passing lane. The side-by-side running determination region 81 includes a position right beside the own-vehicle 51 and has at least the length of one vehicle. In the example illustrated in FIG. 14, the vehicle 61 is in the side-by-side running determination region 81. When it is sensed that the vehicle 61 is staying in the side-by-side running determination region 81 for a predetermined side-by-side running determination time or longer, the side-by-side running avoidance control unit 39 controls driving of the own-vehicle to avoid side-by-side running with the vehicle 61.

The present embodiment is also characterized in the contents of the evasive preparation by the evasive preparation execution unit 36. In the present embodiment, the evasive preparation execution unit 36 executes only the seventh evasive preparation among the evasive preparations exemplarily illustrated in FIG. 10. Specifically, the evasive preparation execution unit 36 executes, as the evasive preparation, increase of the side-by-side running determination region set in the side-by-side running avoidance control in the lane direction and reduction of the side-by-side running determination time.

The present embodiment is also characterized in a relative motion as a condition for execution of the evasive action by the evasive action execution unit 38. The evasive action execution unit 38 senses, as the predetermined relative motion of the monitoring target vehicle relative to the own-vehicle, staying of the monitoring target vehicle in the side-by-side running determination region for the side-by-side running determination time or longer after the above-described evasive preparation is performed by the evasive preparation execution unit 36. The following describes specific examples of the evasive preparation and the evasive action with reference to FIG. 15.

Figure 15:
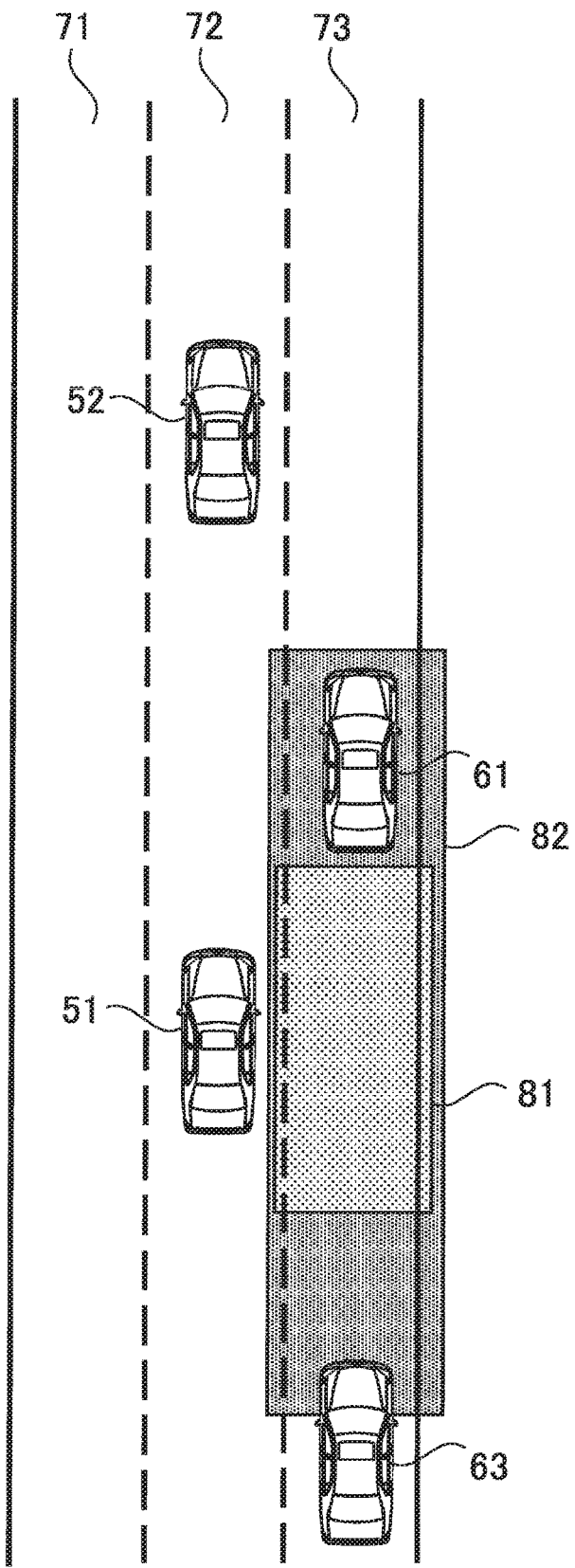
FIG. 15 is a view illustrating an evasive preparation executed by the vehicle control device according to the second embodiment of the present disclosure.

FIG. 15 illustrates a situation in which the own-vehicle 51 and the preceding vehicle 52 are traveling on the own-lane 72 and the two vehicles 61 and 63 are traveling on the adjacent lane 73. The monitoring target vehicle is the vehicle 61 traveling at a position diagonally in front of the own-vehicle 51. In the evasive preparation, the side-by-side running determination region 81 is increased to a region 82. In the example illustrated in FIG. 15, the side-by-side running determination region 82 is increased forward and backward in the lane direction relative to the original side-by-side running determination region 81, but may be increased forward only.

In the example illustrated in FIG. 15, the monitoring target vehicle 61 is in the increased side-by-side running determination region 82. The evasive action execution unit 38 senses, as the predetermined relative motion of the monitoring target vehicle 61 relative to the own-vehicle 51, staying of the monitoring target vehicle 61 in the side-byside running determination region 82 for the predetermined side-by-side running determination time or longer. However, the side-by-side running determination time used in the determination by the evasive action execution unit 38 is set to be shorter than the side-by-side running determination time used in the determination by the side-by-side running avoidance control unit 39. The evasive action executed by the evasive action execution unit 38 may be, lane change, deceleration, or acceleration. An optimum operation is selected to avoid interference with another vehicle around the own-vehicle.

2-2-2. Avoidance Control

Figure 16:
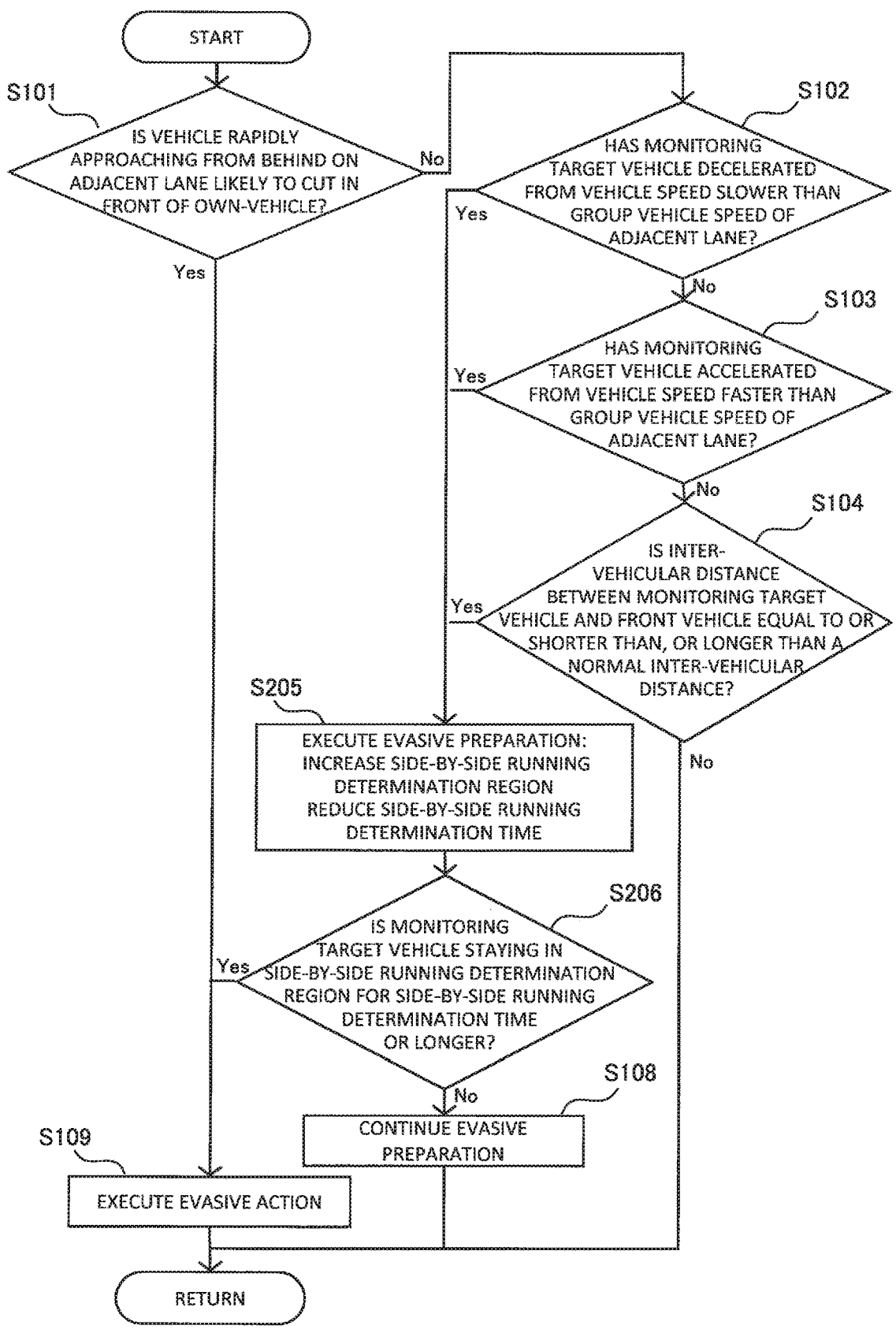
FIG. 16 is a flowchart illustrating the routine of avoidance control executed by the vehicle control device according to the second embodiment of the present disclosure.

The above-described functions of the ECU 30 as the vehicle control device are used in avoidance control for cut-in of another vehicle from an adjacent lane. FIG. 16 is a flowchart illustrating the routine of avoidance control executed by the ECU 30 in the present embodiment. The ECU 30 repeatedly executes the routine illustrated in FIG. 16 in a predetermined control period. The above-described side-by-side running avoidance control is executed by a routine different from the routine of the avoidance control. The following describes the contents of the routine of the avoidance control according to the present embodiment with focus on difference from the routine of the avoidance control according to the first embodiment.

In the routine of the avoidance control according to the present embodiment, processing at step S205 is performed in place of the processing at step S105 in the routine illustrated in FIG. 12. Determination at step S206 is performed in place of the determination at steps S106 and S107 in the routine illustrated in FIG. 12.

The processing at step S205 is executed when the result of the determination at any one of steps S102, S103, and S104 is positive. At step S205, increase of the side-by-side running determination region and reduction of the side-by-side running determination time are performed as the evasive preparation.

After the evasive preparation is executed at step S205, the determination at step S206 is performed. At step S206, it is determined whether the monitoring target vehicle is staying in the side-by-side running determination region for the side-by-side running determination time or longer. When a result of the determination at step S206 is positive, the present routine proceeds to step S109 to execute the evasive action, which ends the present routine. The evasive action thus executed is braking according to the combinations illustrated in FIG. 10, but may be lane change or acceleration, depending on the surrounding situation. When the result of the determination at step S206 is negative, the evasive preparation is continued at step S108, and then the present routine ends.

What is claimed is:

1. A vehicle control device comprising:
   a sensor configured to detect objects surrounding an own vehicle;
   a memory storing at least one instruction;
   at least one processor configured to execute the at least one instruction to:
      recognize an object around the own-vehicle based on information received from the sensor;
      detect a monitoring target vehicle that may potentially cut into an own-lane from an adjacent lane among objects recognized by the processor;
      execute an evasive preparation based on a predetermined relative motion of the monitoring target vehicle relative to traffic flow of the adjacent lane being sensed, the evasive preparation comprising adjusting control parameters of the control device or controlling driving components of the own-vehicle; and
      execute an evasive action corresponding to the evasive preparation to avoid interference between the monitoring target vehicle and the own-vehicle based on a predetermined relative motion of the monitoring target vehicle relative to the own-vehicle being sensed after the evasive preparation is executed.

2. The vehicle control device according to claim 1, wherein the at least one processor is further configured to obtain, as the predetermined relative motion of the monitoring target vehicle relative to the flow of the adjacent lane, acceleration of the monitoring target vehicle from a vehicle speed faster than a group vehicle speed of the adjacent lane, or deceleration of the monitoring target vehicle from a vehicle speed slower than the group vehicle speed of the adjacent lane.

3. The vehicle control device according to claim 1, wherein the at least one processor is further configured to obtain, as the predetermined relative motion of the monitoring target vehicle relative to the flow of the adjacent lane, a longer inter-vehicular distance between the monitoring target vehicle and a front vehicle on the adjacent lane than a reference range, or the inter-vehicular distance shorter than the reference range.

4. The vehicle control device according to claim 1, wherein the at least one processor is further configured to obtain, as the predetermined relative motion of the monitoring target vehicle relative to the own-vehicle, adjustment of a vehicle speed of the monitoring target vehicle to a vehicle speed of the own-vehicle by the monitoring target vehicle.

5. The vehicle control device according to claim 1, wherein the at least one processor is further configured to obtain, as the predetermined relative motion of the monitoring target vehicle relative to the own-vehicle, staying of the monitoring target vehicle at a constant inter-vehicular distance from the own-vehicle for a predetermined time or longer.

6. The vehicle control device according to claim 1, at least one processor is further configured to control, based on another vehicle staying in a side-by-side running determination region set on the adjacent lane for a side-by-side running determination time or longer being detected, driving of the own-vehicle to avoid side-by-side running with the other vehicle; and
   execute, as the evasive preparation, increase of the side-by-side running determination region in a lane direction of the adjacent lane and reduction of the side-by-side running determination time when the predetermined relative motion of the monitoring target vehicle relative to the flow of the adjacent lane is sensed.

7. The vehicle control device according to claim 6, wherein the at least one processor is further configured to obtain, as the predetermined relative motion of the monitoring target vehicle relative to the own-vehicle, staying of the monitoring target vehicle in the side-by-side running determination region for the side-by-side running determination time or longer.

8. The vehicle control device according to claim 1, wherein the at least one processor is further configured to detect, as the monitoring target vehicle, a vehicle traveling at a position diagonally in front of the own-vehicle on the adjacent lane.

9. The vehicle control device according to claim 1, wherein the at least one processor is further configured to detect, as the monitoring target vehicle, a vehicle traveling in a monitoring region set on the adjacent lane and including a position right beside the own-vehicle.

10. The vehicle control device according to claim 1, wherein the at least one processor is further configured to immediately execute the evasive action before execution of the evasive preparation based on:
- a first vehicle approaching from behind on the adjacent lane at a vehicle speed faster than a group vehicle speed of the adjacent lane and a time to collision (TTC) of the first vehicle with a front vehicle on the adjacent lane becomes equal to or smaller than a predetermined value while an inter-vehicular distance between the own-vehicle; and
- a preceding vehicle on the own-lane being longer than a first reference distance and an inter-vehicular distance between the own-vehicle and an adjacent preceding vehicle on the adjacent lane being longer than a second reference distance.

11. The vehicle control device according to claim 1, wherein the evasive action comprises at least one operation of steering, deceleration, or acceleration.

12. The vehicle control device according to claim 1, wherein the evasive preparation comprises one or more of deepening brake pad position, down shifting, and steering within the range of play.

13. The vehicle control device according to claim 1, wherein the evasive preparation comprises one or more of setting a larger time to collision threshold, changing a size of a side by side running determination region; increasing a size of a preceding vehicle determination region, and setting an earlier response to a direction indicator of the monitoring target vehicle.

14. The vehicle control device according to claim 1, wherein executing the evasive preparation provides the own-vehicle in a state in which the corresponding evasive action can be performed more readily than before the state.

15. A vehicle control device comprising:
- a sensor configured to detect objects surrounding an own vehicle;
- a memory storing at least one instruction;
- at least one processor configured to execute the at least one instruction to:
  - recognize an object around the own-vehicle based on information received from the sensor;
  - detect a monitoring target vehicle that may potentially cut into an own-lane from an adjacent lane among objects recognized by the processor;
  - based on an obtained time to collision (TTC) between the monitoring target vehicle and the own-vehicle being greater than a preset threshold time, execute an evasive preparation for cut-in of the monitoring target vehicle when a predetermined relative motion of the monitoring target vehicle relative to traffic flow of the adjacent lane is sensed and execute an evasive action to avoid interference between the monitoring target vehicle and the own-vehicle when a predetermined relative motion of the monitoring target vehicle relative to the own-vehicle is sensed after the evasive preparation is executed; and
  - based on an obtained TTC between the monitoring target vehicle and the own-vehicle being less than or equal to the preset threshold time, execute the evasive action to avoid interference between the monitoring target vehicle and the own-vehicle when the predetermined relative motion of the monitoring target vehicle relative to the own-vehicle is sensed before the evasive preparation is executed.

* * * * *